J. N. PARKER.
TRACTOR.
APPLICATION FILED DEC. 8, 1921.

1,430,251.

Patented Sept. 26, 1922.
2 SHEETS—SHEET 2.

Inventor
Joseph N. Parker

By
Attorney

Patented Sept. 26, 1922.

1,430,251

UNITED STATES PATENT OFFICE.

JOSEPH N. PARKER, OF BEDFORD, VIRGINIA.

TRACTOR.

Application filed December 8, 1921. Serial No. 521,001.

*To all whom it may concern:*

Be it known that I, JOSEPH N. PARKER, a citizen of the United States, residing at Bedford, in the county of Bedford and State of Virginia, have invented certain new and useful Improvements in Tractors, of which the following is a specification.

This invention relates to tractors, and it comprises a pair of frames having separate power plants mounted thereon, means for connecting each power plant to the adjacent side walls, and a connecting member arranged between said frames, the frames being pivotally mounted on said member.

An object of the invention is the provision of a tractor having an unobstructed space between the frames to facilitate its use for agricultural work.

A further object is the provision of a tractor having independent drive plants for the two sets of wheels, eliminating the necessity of a differential apparatus.

A further object is the provision of improved connecting means between the two frames forming a tractor.

In the accompanying drawings, I have shown one embodiment of the invention. In this showing:

Figure 1:
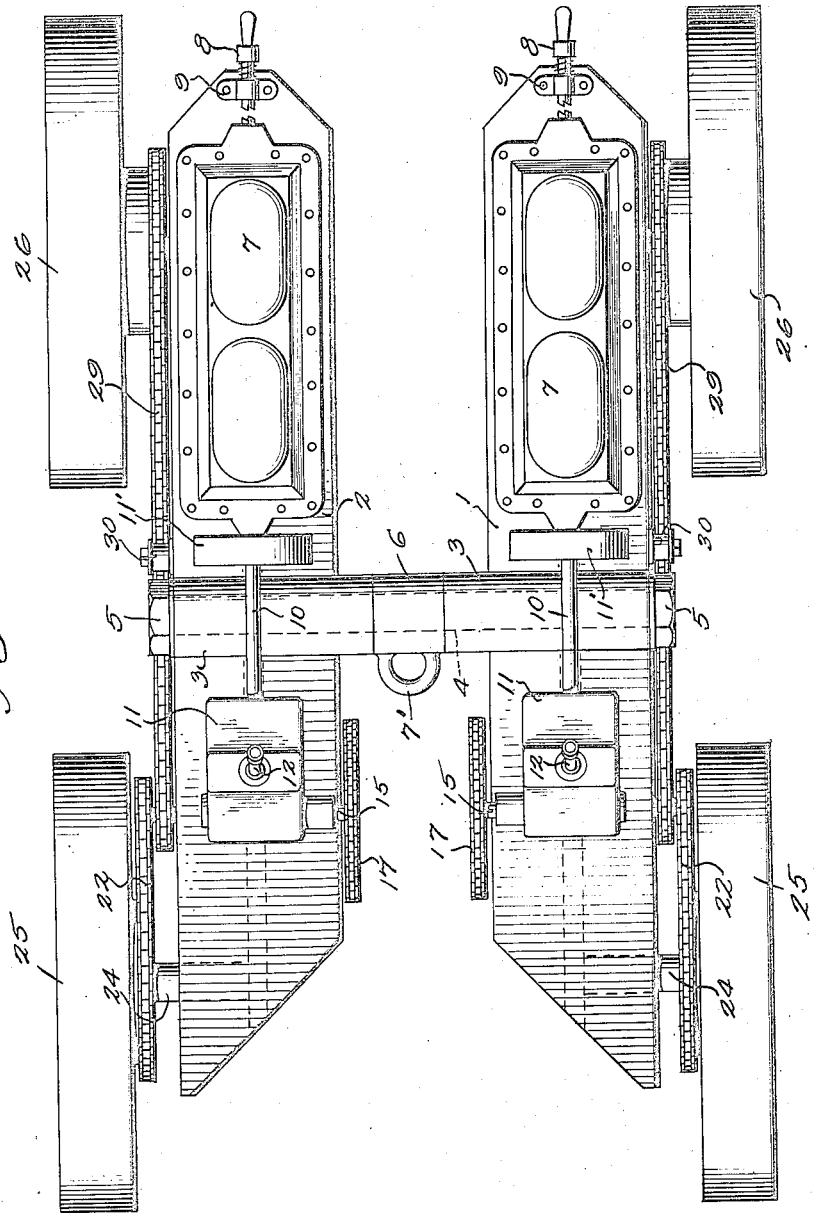
Figure 1 is a plan view.
Figure 2:
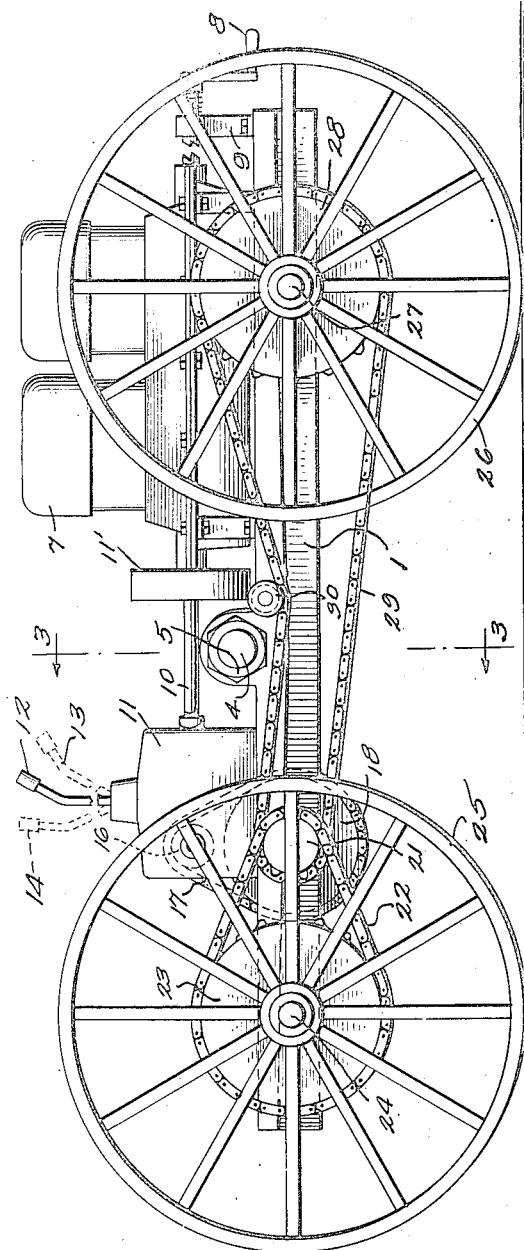
Figure 2 is a side elevation.
Figure 3:
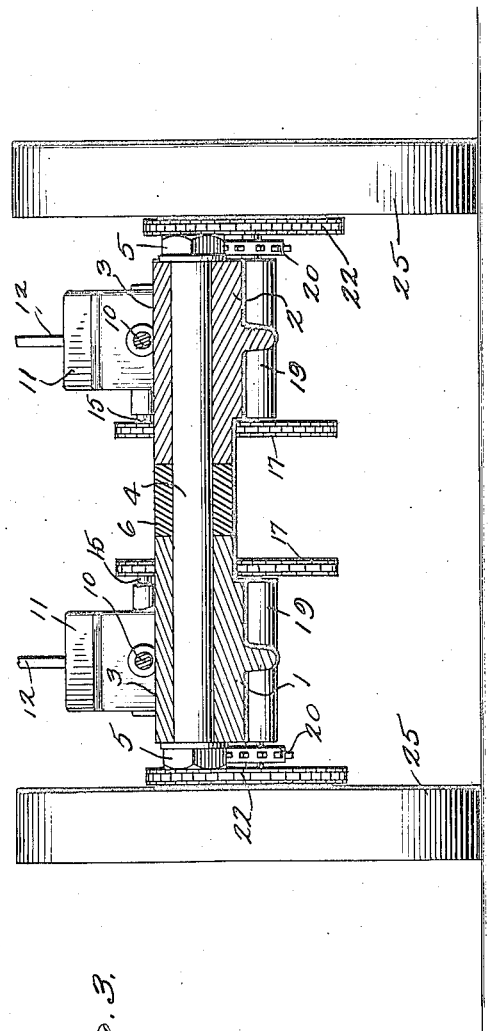
Figure 3 is a transverse sectional view on line 3—3 of Figure 2.

Referring to the drawings, the reference numerals 1 and 2 designate a pair of frames forming a tractor. These frames are each provided with journals 3, for the reception of a connecting member 4. The connecting member is in the form of a pin or bolt, which is received in the journals, permitting the frames to swing about the connecting member in a vertical plane. The connecting member may be formed with threaded ends for the reception of nuts 5, permitting it to be tightened. A draft link 6 is adapted to be arranged between the journals 3, the draft link being provided with an eye 7', for the reception of chains or other attaching means, whereby suitable agricultural implements may be secured to the tractor.

A separate power unit is mounted on each frame. As shown, an engine 7 is arranged on the frame, the engine being provided with a starting crank 8 mounted in a bracket 9 at the front of the frame and having a shaft 10. A fly wheel 11' is mounted on the shaft. The shaft extends into a gear box 11 where-in suitable planetary gearing (not shown) is provided, adapted to be driven by the shaft 10. A control lever 12 is arranged on the top of the gear box. The control lever may be suitably connected to the gearing to drive the tractor in either direction at different speeds. In the full line position shown, the gearing is out of mesh, or in neutral. When the lever is moved forward to the dotted line position 13, the connected wheels are driven forwardly. When the lever is moved to the dotted line position 14, the gearing is in reverse. A shaft 15 extends from the gear box transversely of the machine, and this shaft is provided with a sprocket 16. A chain 17 passes over this sprocket and engages a sprocket 18 mounted on a transverse shaft arranged beneath the frame and supported in a journal 19. This lower shaft is provided with a pair of sprockets 20 and 21. A chain 22 passes over the outer sprocket 21 and engages the sprocket 23 arranged on an axle 24. The axle is of the sub-axle type, suitably supported in the frame and carries a wheel 25. The tractor is provided with a front wheel 26 mounted on an axle 27, which is also journaled in the frame and this axle is provided with a sprocket 28. A chain 29 passes from the sprocket 28 and the sprocket 20 to drive the front wheel. This chain also passes under an idler 30 to maintain it below the top of the frame and prevent it from becoming engaged with the parts of the engine.

In operation, the wheels 25 and 26 on each side of the vehicle are driven by their respective engines 7 through the gearing contained in gear box 11. In steering the tractor, the wheels on one side are disconnected from the drive and the wheels on the opposite side driven in the usual manner. The provision of separate power plants mounted on frames arranged at the side gives an unobstructed space in the center except the space occupied by the journals 3 and the pin 4. This is very advantageous in agricultural work.

The connecting means between the two frames permits either frame to swing in a vertical plane as on a pivot, to accommodate itself to unevenness in the ground over which the tractor is passing.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A tractor comprising a pair of frames, a connecting member arranged between said frames to maintain them in spaced relation, a power unit mounted on each of said frames, wheels mounted on the outside of each frame, a drive shaft connected to each power unit, a pair of sprockets mounted on each of said drive shafts, sprockets mounted on said wheels, and chains passing over the sprockets on said drive shafts and the sprockets on said wheels.

2. A tractor comprising a pair of supporting frames, journals carried by said frames, a connecting member comprising a bolt mounted in said journals whereby said frames are pivotally mounted on said connecting member, stub axles journaled in said frames, wheels mounted on said axles, a power unit mounted on each of said frames, a drive shaft connected to each of said power units, sprockets mounted on said drive shaft, sprockets mounted on said stub axles, and chains passing over said sprockets to drive said axles.

3. A tractor comprising a pair of spaced longitudinal frames, a transverse bearing carried by each of said frames, a bolt pivotally received in said bearings and extending entirely across said frames, a draft link pivotally mounted on said bolt between the inner ends of said bearings, said link contacting with said bearings whereby said frames are maintained in spaced relation, and wheels mounted on the outside of each of said frames.

In testimony whereof I affix my signature in presence of two witnesses.

JOSEPH N. PARKER

Witnesses:
O. C. RUCKER,
E. C. BURKS.